United States Patent
Kida et al.

(10) Patent No.: US 9,804,191 B2
(45) Date of Patent: Oct. 31, 2017

(54) SENSOR CALIBRATION METHOD FOR VEHICLE

(71) Applicant: TOYOTA JIDOSHA KABUSHIKI KAISHA, Toyota-shi (JP)

(72) Inventors: Yusuke Kida, Toyota (JP); Takahiro Nakayama, Nagoya (JP); Takahiro Toda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 63 days.

(21) Appl. No.: 14/857,144

(22) Filed: Sep. 17, 2015

(65) Prior Publication Data
US 2016/0116500 A1 Apr. 28, 2016

(30) Foreign Application Priority Data

Oct. 28, 2014 (JP) .................................. 2014-219563

(51) Int. Cl.
*G01C 25/00* (2006.01)
*G01P 21/00* (2006.01)
(Continued)

(52) U.S. Cl.
CPC ............ *G01P 21/00* (2013.01); *B62K 11/007* (2016.11); *G01C 25/005* (2013.01); *G01P 15/18* (2013.01)

(58) Field of Classification Search
CPC ....... G01C 15/18; G01C 25/005; G01P 15/18; G01P 21/00; B62K 11/007
(Continued)

(56) References Cited

U.S. PATENT DOCUMENTS

2009/0018772 A1* 1/2009 Watanabe ............ G01C 21/165
701/472
2009/0254279 A1* 10/2009 Han ....................... G01C 21/16
701/501
(Continued)

FOREIGN PATENT DOCUMENTS

JP 2002-243494 A 8/2002
JP 2004-125689 A 4/2004
(Continued)

OTHER PUBLICATIONS

"Everything about STMicroelectronics' 3-axis digital MEMS gyroscopes", TA0343 Technical article, Doc ID 022032 Rev1, 2011, 40 pgs.

*Primary Examiner* — R. A. Smith
*Assistant Examiner* — John M Royston
(74) *Attorney, Agent, or Firm* — Oblon, McClelland, Maier & Neustadt, L.L.P.

(57) ABSTRACT

An inverted two-wheel vehicle includes: an inverted two-wheel vehicle body; an acceleration sensor and a gyro sensor which are mounted on the same substrate; and an ECU. The ECU calculates a mounting angle error of the acceleration sensor with respect to the inverted two-wheel vehicle body based on an output value of the acceleration sensor obtained when the inverted two-wheel vehicle is brought into a stationary state in a state where a reference yaw axis of the inverted two-wheel vehicle is made coincident with a vertical direction, and corrects an output value of the gyro sensor by using the mounting angle error of the acceleration sensor with respect to the inverted two-wheel vehicle body as a mounting angle error of the gyro sensor with respect to the inverted two-wheel vehicle body.

3 Claims, 13 Drawing Sheets

(51) Int. Cl.
*G01P 15/18* (2013.01)
*B62K 11/00* (2006.01)

(58) Field of Classification Search
USPC ........................................ 73/1.77, 1.37, 1.75
See application file for complete search history.

(56) References Cited

U.S. PATENT DOCUMENTS

2009/0295722 A1* 12/2009 Yamamoto ............ G06F 3/0346
　　　　　　　　　　　　　　　　　　　345/158
2014/0330507 A1　　11/2014　Oikawa

FOREIGN PATENT DOCUMENTS

| JP | 2009-204459 A | 9/2009 |
| JP | 2010-281598 | 12/2010 |
| JP | 2013-079856 | 5/2013 |
| JP | 2013-116684 | 6/2013 |

* cited by examiner

SENSOR CALIBRATION METHOD FOR VEHICLE

INCORPORATION BY REFERENCE

This application is based upon and claims the benefit of priority from Japanese patent application No. 2014-219563, filed on Oct. 28, 2014, the disclosure of which is incorporated herein in its entirety by reference.

BACKGROUND OF THE INVENTION

1. Field of the Invention

The present invention relates to a sensor calibration method for a vehicle.

2. Description of Related Art

Japanese Unexamined Patent Application Publication No. 2013-116684 discloses a technique for estimating a mounting angle error of a gyro sensor with respect to an inverted vehicle body and correcting an output value of the gyro sensor so as to cancel the mounting angle error.

Specifically, the technique includes: (1) obtaining bias values of the roll axis and the pitch axis of the gyro sensor when the inverted vehicle is brought into a stationary state in a state where a reference yaw axis of the inverted vehicle is made coincident with the vertical direction; (2) obtaining bias values of the roll axis and the pitch axis of the gyro sensor when the inverted vehicle is turned on a pivot in the state where the reference yaw axis of the inverted vehicle is made coincident with the vertical direction; (3) estimating a mounting angle error of the gyro sensor with respect to the inverted vehicle body based on the bias values obtained in (1), the bias values obtained in (2), and a turning angular velocity obtained when the inverted vehicle is turned on a pivot; and (4) correcting an output value of the gyro sensor based on the estimated mounting angle error.

SUMMARY OF THE INVENTION

In the method disclosed in Japanese Unexamined Patent Application Publication No. 2013-116684, it is necessary to turn the inverted vehicle itself on a pivot so as to correct the output value of the gyro sensor, which necessitates a large test apparatus.

Therefore, it is an object of the present invention to provide a technique capable of correcting an output value of a gyro sensor without using a large test apparatus that allows a vehicle itself to turn on a pivot.

A first exemplary aspect of the present invention is a sensor calibration method for a vehicle, the vehicle including: a vehicle body; an acceleration sensor; and a gyro sensor, a geometrical posture of the gyro sensor with respect to the acceleration sensor being known, the sensor calibration method including: calculating a mounting angle error of the acceleration sensor with respect to the vehicle body based on an output value of the acceleration sensor when the vehicle is brought into a stationary state in a state where a reference yaw axis of the vehicle is made coincident with a vertical direction; and correcting an output value of the gyro sensor by using the mounting angle error of the acceleration sensor with respect to the vehicle body as a mounting angle error of the gyro sensor with respect to the vehicle body. According to the above method, the output value of the gyro sensor can be corrected without using a large test apparatus that allows the vehicle itself to turn on a pivot.

An offset value of the acceleration sensor is obtained in advance prior to mounting of the acceleration sensor and the gyro sensor on the vehicle body. According to the above method, the output value of the gyro sensor can be corrected merely by bringing the vehicle into the stationary state in the state where the reference yaw axis of the vehicle is made coincident with the vertical direction, without the need for causing the vehicle to make a special motion, such as inclination, after the vehicle is brought into the stationary state.

The mounting angle error of the acceleration sensor with respect to the vehicle body is calculated based on: an output value of the acceleration sensor obtained when the vehicle is brought into the stationary state in the state where the reference yaw axis of the vehicle is made coincident with the vertical direction; an output value of the acceleration sensor obtained when the vehicle is inclined at an arbitrary angle in a roll direction from the state where the reference yaw axis of the vehicle is made coincident with the vertical direction and the vehicle is then brought into the stationary state; and an output value of the acceleration sensor obtained when the vehicle is inclined at an arbitrary angle in a pitch direction from the state where the reference yaw axis of the vehicle is made coincident with the vertical direction and the vehicle is then brought into the stationary state. According to the above method, the output value of the gyro sensor can be corrected without the need for obtaining an offset value of the acceleration sensor in advance prior to mounting of the acceleration sensor and the gyro sensor on the vehicle body.

According to the present invention, it is possible to correct an output value of a gyro sensor without using a large test apparatus that turns a vehicle itself on a pivot.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

A first exemplary embodiment of the present invention will be described below.

Figure 1:
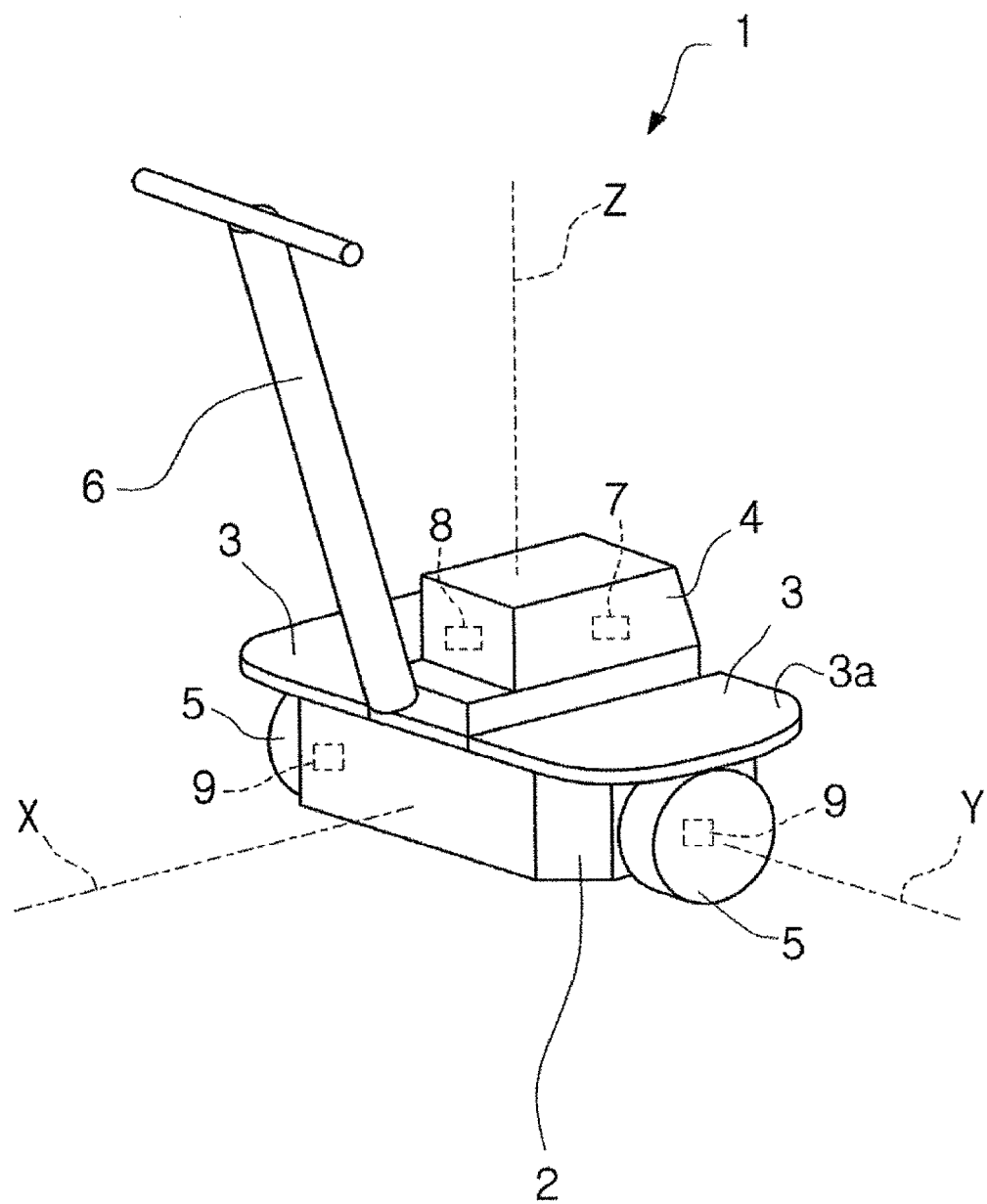
FIG. 1 is a perspective view showing an appearance of an inverted two-wheel vehicle (first exemplary embodiment)

An inverted two-wheel vehicle 1 (i.e., a vehicle, an inverted vehicle) shown in FIG. 1 is a vehicle for transporting a person (rider) riding thereon in a desired direction. The inverted two-wheel vehicle 1 travels according to an operation that is performed by the rider riding on the inverted two-wheel vehicle 1.

The inverted two-wheel vehicle 1 includes an inverted two-wheel vehicle body 2 (i.e., a vehicle body, an inverted vehicle body), a pair of footrests 3, an ECU 4 (Engine Control Unit), two wheels 5, a handle 6, a posture angle sensor 7, and a handle angle sensor 8.

The pair of footrests 3 and the ECU 4 are mounted on the inverted two-wheel vehicle body 2.

The two wheels 5 are respectively mounted on both side surfaces of the inverted two-wheel vehicle body 2 in a rotatable manner.

The handle 6 is mounted at a front end of the inverted two-wheel vehicle body 2.

In the first exemplary embodiment, the posture angle sensor 7 and the handle angle sensor 8 are accommodated in the ECU 4.

The inverted two-wheel vehicle body 2 includes two motors 9. The two motors 9 drive the two wheels 5, respectively.

The inverted two-wheel vehicle body 2 has a reference yaw axis Z which is used as a reference yaw axis for the inverted two-wheel vehicle body 2. For example, the reference yaw axis Z is defined to be orthogonal to a footrest surface 3a of each footrest 3. Similarly, a reference pitch axis Y which is used as a reference pitch axis for the inverted two-wheel vehicle body 2 is defined as, for example, a rotation axis common to the two wheels 5. A reference roll axis X which is used as a reference roll axis for the inverted two-wheel vehicle body 2 is defined as, for example, an axis that is orthogonal to the reference yaw axis Z and orthogonal to the reference pitch axis Y.

Figure 2:
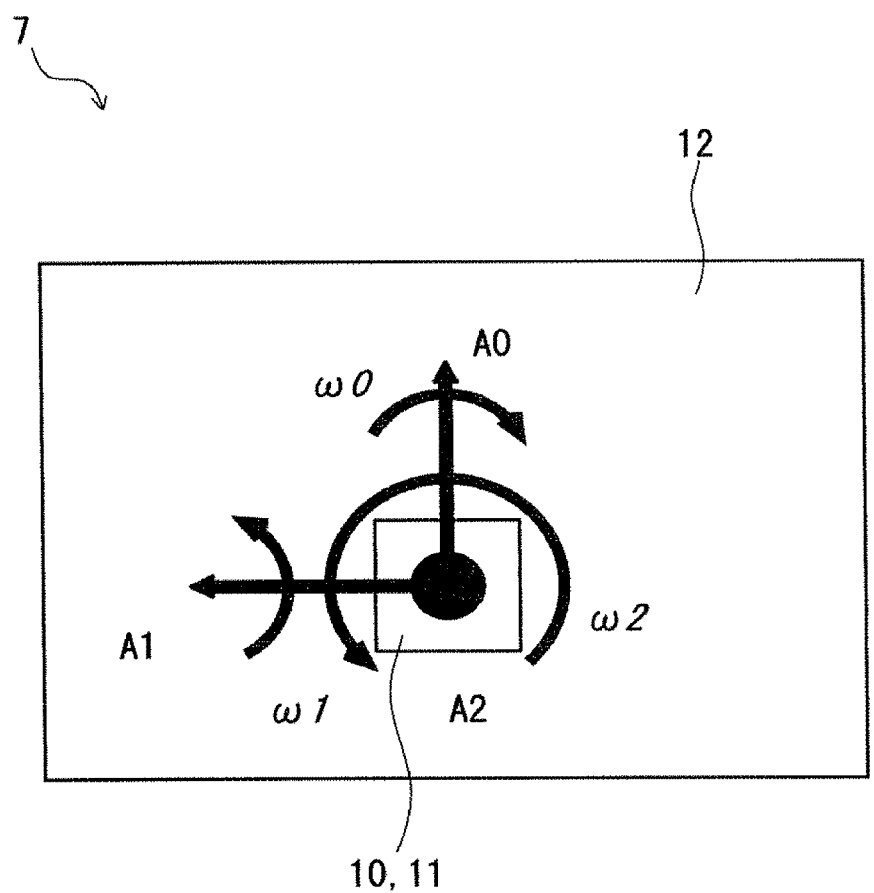
FIG. 2 is a schematic plan view of a posture angle sensor (first exemplary embodiment)
Figure 3:
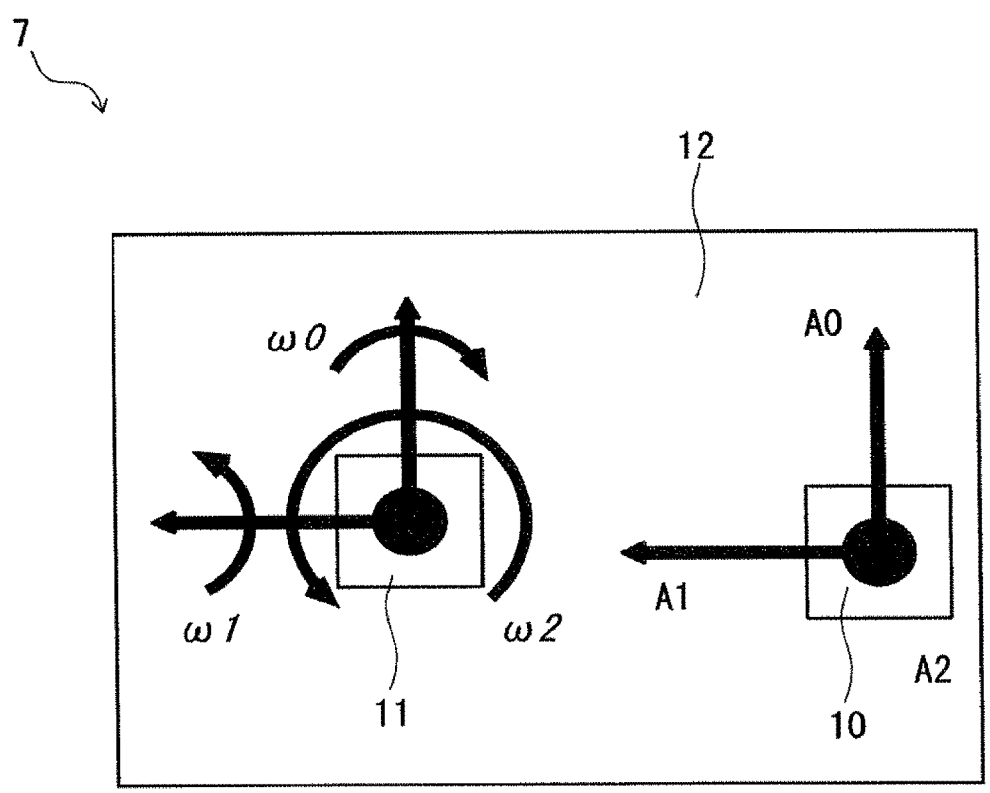
FIG. 3 is a schematic plan view of the posture angle sensor (first exemplary embodiment)
Figure 4:
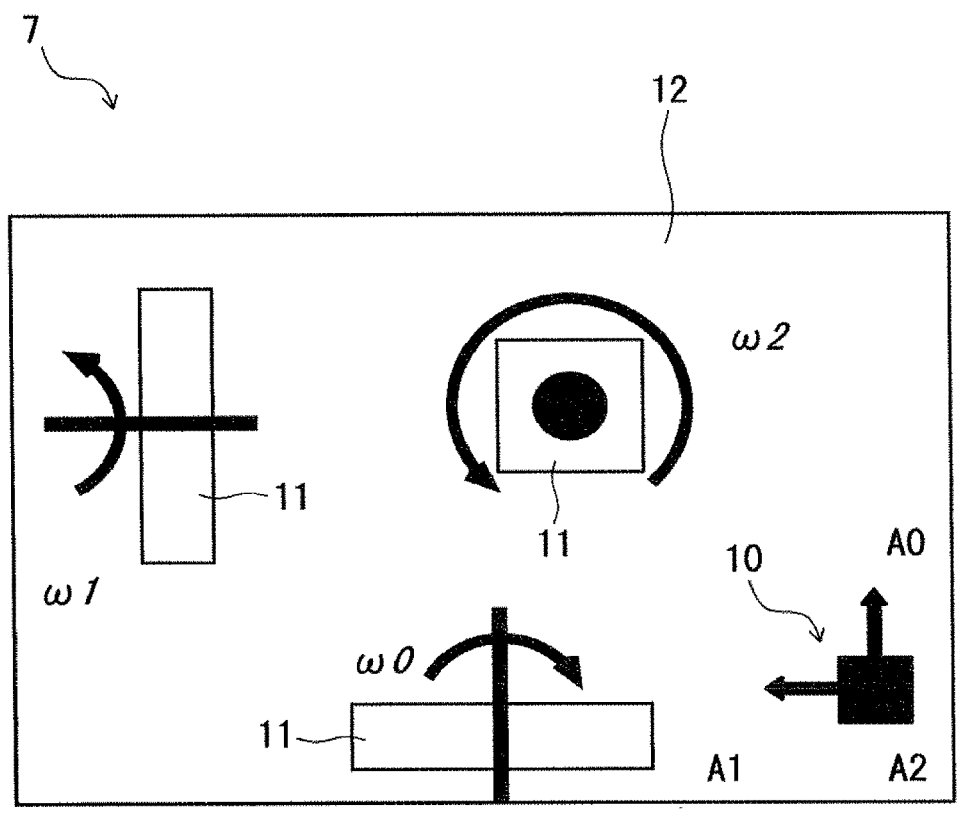
FIG. 4 is a schematic plan view of the posture angle sensor (first exemplary embodiment)

As shown in FIGS. 2 to 4, the posture angle sensor 7 is composed of, for example, an acceleration sensor 10, a gyro sensor 11, and a substrate 12. In the example shown in FIG. 2, the acceleration sensor 10 capable of detecting three-axis acceleration and the gyro sensor 11 capable of detecting an angular velocity around three axes are mounted on the surface of the substrate 12 in a state where the acceleration sensor 10 and the gyro sensor 11 are integrated in the same chip. In the example shown in FIG. 3, the acceleration sensor 10 capable of detecting three-axis acceleration and the gyro sensor 11 capable of detecting an angular velocity around three axes are mounted on the surface of the substrate 12 in such a manner that the acceleration sensor 10 and the gyro sensor 11 are respectively mounted on two chips. In the example shown in FIG. 4, the acceleration sensor 10 capable of detecting three-axis acceleration and three gyro sensors 11 capable of detecting an angular velocity around any one of the axes are mounted on the surface of the substrate 12 in a state where the acceleration sensor 10 and the three gyro sensors 11 are respectively mounted on four chips. In each of the examples shown in FIGS. 2 to 4, the acceleration sensor 10 and the gyro sensor 11 are mounted on the surface of the same substrate 12. In other words, the geometrical posture of the gyro sensor 11 with respect to the acceleration sensor 10 is known. A mounting angle error of the acceleration sensor 10 with respect to the inverted two-wheel vehicle body 2 is equal to a mounting angle error of the gyro sensor 11 with respect to the inverted two-wheel vehicle body 2. Note that the acceleration sensor 10 and the gyro sensor 11 need not necessarily be mounted on the surface of the same substrate 12, as long as the geometrical posture of the gyro sensor 11 with respect to the acceleration sensor 10 is known. For example, the acceleration sensor 10 may be directly mounted on the inverted two-wheel vehicle body 2 without involving the substrate 12, and the gyro sensor 11 may be directly mounted on the inverted two-wheel vehicle body 2 without involving the substrate 12. Similarly, the acceleration sensor 10 and the gyro sensor 11 need not necessarily be mounted on the surface of the same substrate 12, as long as a mounting angle error of the acceleration sensor 10 with respect to the inverted two-wheel vehicle body 2 is equal to a mounting angle error of the gyro sensor 11 with respect to the inverted two-wheel vehicle body 2. For example, the acceleration sensor 10 may be directly mounted on the inverted two-wheel vehicle body 2 without involving the substrate 12, and the gyro sensor 11 may be directly mounted on the inverted two-wheel vehicle body 2 without involving the substrate 12. In the first exemplary embodiment, the acceleration sensor 10 and the gyro sensor 11 are mounted on the surface of the same substrate 12 so that the gyro sensor 11 can have a known geometrical posture with respect to the acceleration sensor 10. In the first exemplary embodiment, the acceleration sensor 10 and the gyro sensor 11 are mounted on the surface of the same substrate 12 so as to match a mounting angle error of the acceleration sensor 10 with respect to the inverted two-wheel vehicle body 2 with a mounting angle error of the gyro sensor 11 with respect to the inverted two-wheel vehicle body 2.

Figure 5:
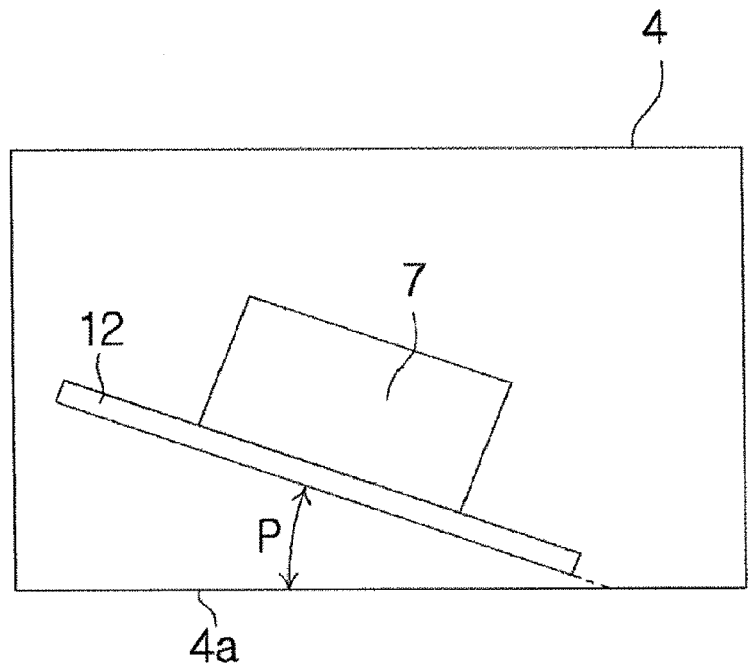
FIG. 5 is a schematic front view of an ECU (Engine Control Unit) which accommodates the posture angle sensor (first exemplary embodiment)

FIG. 5 shows a mounting angle error P of the posture angle sensor 7 with respect to the ECU 4 when the posture angle sensor 7 is accommodated in the ECU 4. As shown in FIG. 5, it is substantially impossible to make the substrate 12 of the posture angle sensor 7 completely parallel to a reference plane 4a.

Figure 6:
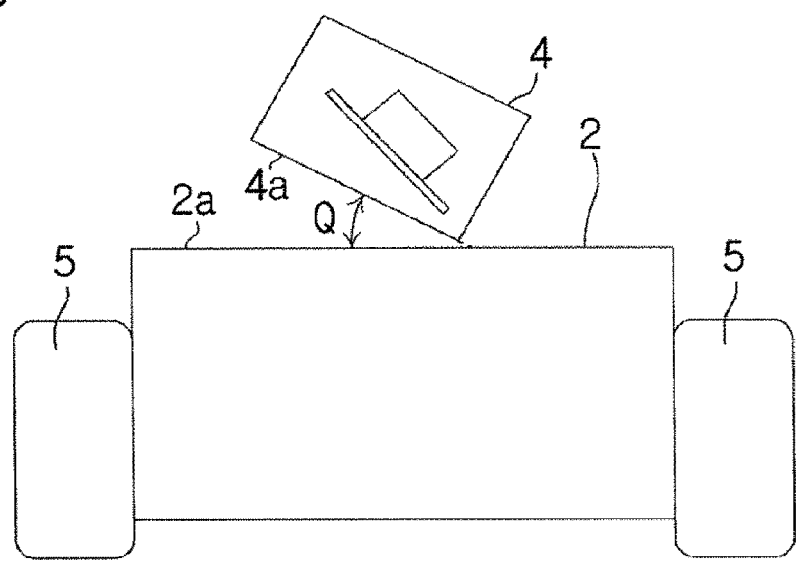
FIG. 6 is a schematic front view showing an inverted two-wheel vehicle body on which the ECU is mounted (first exemplary embodiment)

FIG. 6 shows a mounting angle error Q of the ECU 4 with respect to the inverted two-wheel vehicle body 2 when the ECU 4 is mounted on the inverted two-wheel vehicle body 2. As shown in FIG. 6, it is substantially impossible to make the reference plane 4a of the ECU 4 completely parallel to a reference plane 2a of the inverted two-wheel vehicle body 2. Note that the reference plane 2a of the inverted two-wheel vehicle body 2 is, for example, a plane orthogonal to the reference yaw axis Z.

Accordingly, the output value of the acceleration sensor 10 is output in a state where an error due to an offset value specific to the acceleration sensor 10 and an error due to the mounting angle error P and the mounting angle error Q are superimposed on a true value.

Similarly, the output value of the gyro sensor 11 is output in a state where an error due to a bias value specific to the gyro sensor 11 and an error due to the mounting angle error P and the mounting angle error Q described above are superimposed on a true value.

The handle angle sensor 8 detects an angle of the handle 6 with respect to the inverted two-wheel vehicle body 2, and outputs the detection result to an inversion control unit 24 as operation information.

Figure 7:
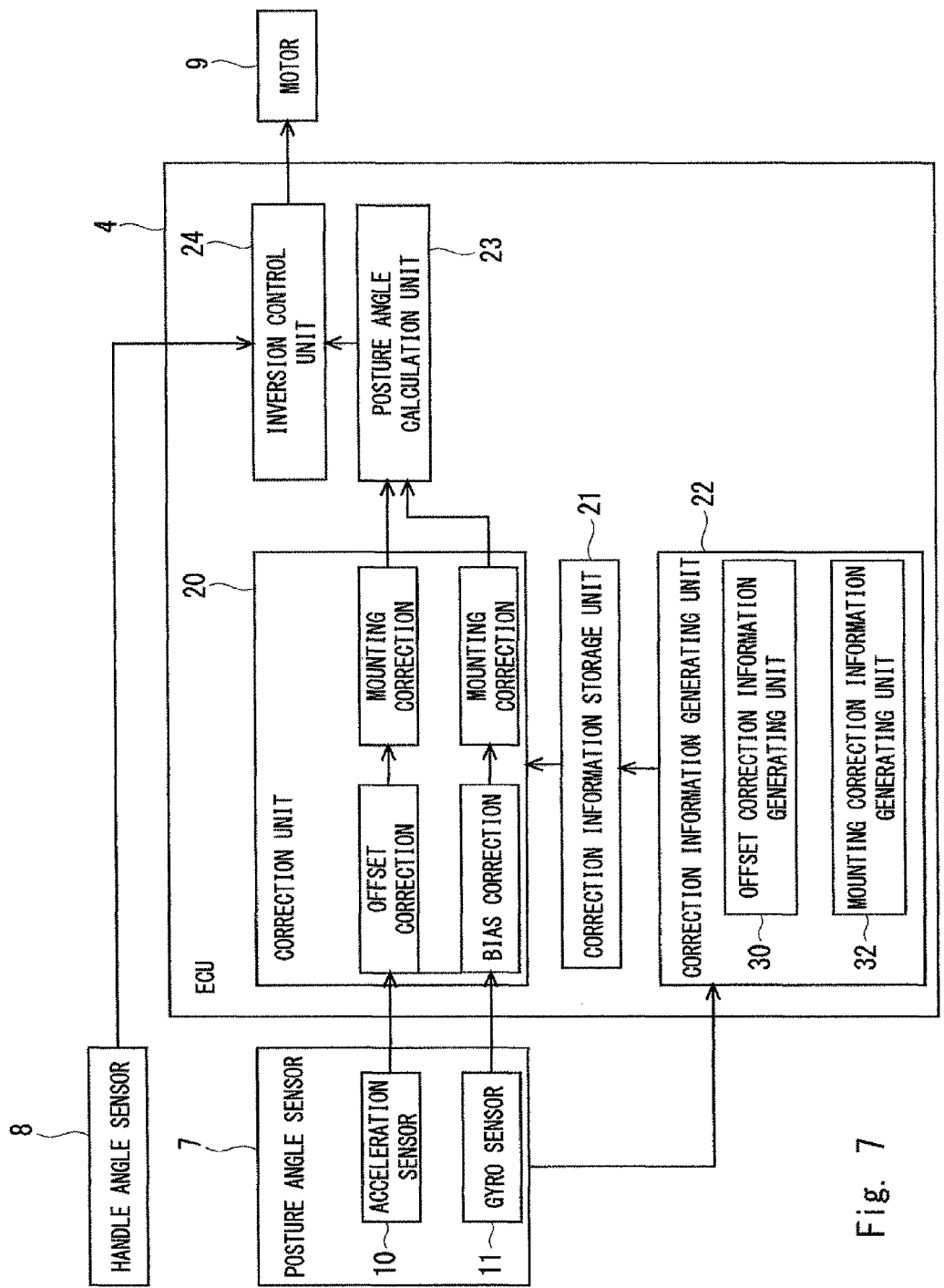
FIG. 7 is a functional block diagram showing an inverted two-wheel vehicle (first exemplary embodiment)

The ECU 4 shown in FIG. 7 includes a CPU (Central Processing Unit), a RAM (Random Access Memory), and a ROM (Read Only Memory). A control program stored in the ROM is read out by the CPU and is executed on the CPU, so that the control program causes hardware, such as the CPU, to function as a correction unit 20, a correction information storage unit 21, a correction information generating unit 22, a posture angle calculation unit 23, and the inversion control unit 24.

The correction unit 20 corrects the output values of the acceleration sensor 10 and the gyro sensor 11 based on correction information stored in the correction information storage unit 21, and outputs the corrected values to the posture angle calculation unit 23.

Specifically, the correction unit 20 first performs a correction to remove an error due to an offset from the output value of the acceleration sensor 10 based on Expression 1 shown below, and then performs a correction to remove an error due to a mounting angle error from the output value of the acceleration sensor 10 based on Expression 2 shown below. The correction unit 20 outputs the corrected values to the posture angle calculation unit 23.

In Expression 1 shown below, accX, accY, and accZ respectively represent X-axis acceleration, Y-axis acceleration, and Z-axis acceleration which are obtained before the correction of the acceleration sensor 10; $\Delta accX$, $\Delta accY$, and $\Delta accZ$ respectively represent offset values of X-axis acceleration, Y-axis acceleration, and Z-axis acceleration of the acceleration sensor 10; and accX', accY', and accZ' respectively represent X-axis acceleration, Y-axis acceleration, and Z-axis acceleration which are obtained after the offset correction of the acceleration sensor 10.

In Expression 2 shown below, $\Delta\phi$ represents a mounting angle error about the roll axis of the acceleration sensor 10 with respect to the inverted two-wheel vehicle body 2; $\Delta\theta$ represents a mounting angle error about the pitch axis of the acceleration sensor 10 with respect to the inverted two-wheel vehicle body 2; and accX'', accY'', and accZ'' respectively represent X-axis acceleration, Y-axis acceleration, and Z-axis acceleration which are obtained after the offset correction and the mounting angle error correction of the acceleration sensor 10.

$$accX' = accX - \Delta accX \quad (1)$$
$$accY' = accY - \Delta accY$$
$$accZ' = accZ - \Delta accZ$$

$$\begin{bmatrix} accX'' \\ accY'' \\ accZ'' \end{bmatrix} = \begin{bmatrix} accX' \cdot \cos(\Delta\theta) + accZ' \cdot \sin(\Delta\theta) \\ accX' \cdot \sin(\Delta\phi)\sin(\Delta\theta) + accY' \cdot \cos(\Delta\phi) - accZ' \cdot \sin(\Delta\phi)\cos(\Delta\theta) \\ -accX' \cdot \cos(\Delta\phi)\sin(\Delta\theta) + accY' \cdot \sin(\Delta\phi) + accZ' \cdot \cos(\Delta\phi)\cos(\Delta\theta) \end{bmatrix} \quad (2)$$

Similarly, the correction unit 20 first performs a correction to remove an error due to a bias from the output value of the gyro sensor 11 based on Expression 3 shown below, and then performs a correction to remove an error due to a mounting angle error from the output value of the gyro sensor 11 based on Expression 4 shown below. The correction unit 20 outputs the corrected values to the posture angle calculation unit 23.

In Expression 3 shown below, $\omega\phi$, $\omega\theta$, and $\omega\psi$ respectively represent a roll axis angular velocity, a pitch axis angular velocity, and a yaw axis angular velocity which are obtained before the correction of the gyro sensor 11; $\Delta\omega\phi$, $\Delta\omega\theta$, and $\Delta\omega\psi$ respectively represent bias values of the roll axis angular velocity, the pitch axis angular velocity, and the yaw axis angular velocity of the gyro sensor 11; and $\omega\phi'$, $\omega\theta'$, and $\omega\psi'$ respectively represent a roll axis angular velocity, a pitch axis angular velocity, and a yaw axis angular velocity which are obtained after the bias correction of the gyro sensor 11.

In Expression 4 shown below, $\Delta\phi$ represents a mounting angle error about the roll axis of the acceleration sensor 10 with respect to the inverted two-wheel vehicle body 2; and $\Delta\theta$ represents a mounting angle error about the pitch axis of the acceleration sensor 10 with respect to the inverted two-wheel vehicle body 2. In this case, the acceleration sensor 10 and the gyro sensor 11 are mounted on the surface of the same substrate 12. Accordingly, the mounting angle error of the acceleration sensor 10 with respect to the inverted two-wheel vehicle body 2 is theoretically equal to the mounting angle error of the gyro sensor 11 with respect to the inverted two-wheel vehicle body 2. Accordingly, $\Delta\phi$ and $\Delta\theta$ which are used for correction to remove an error due to the mounting angle error from the output value of the acceleration sensor 10 can also be used for correction to remove an error due to the mounting angle error from the output value of the gyro sensor 11. In Expression 4, $\omega\phi''$, $\omega\theta''$, and $\omega\psi''$ respectively represent a roll axis angular velocity, a pitch axis angular velocity, and a yaw axis angular velocity which are obtained after the bias correction and the mounting angle error correction of the gyro sensor 11.

$$\omega\phi' = \omega\phi - \Delta\omega\phi \quad (3)$$
$$\omega\theta' = \omega\theta - \Delta\omega\theta$$
$$\omega\psi' = \omega\psi - \Delta\omega\psi$$

$$\begin{bmatrix} \omega\phi'' \\ \omega\theta'' \\ \omega\psi'' \end{bmatrix} = \begin{bmatrix} \cos(\Delta\theta)\omega\phi' + \sin(\Delta\theta)\omega\psi' \\ \sin(\Delta\phi)\sin(\Delta\theta)\omega\phi' + \cos(\Delta\phi)\omega\theta' - \sin(\Delta\phi)\cos(\Delta\theta)\omega\psi' \\ -\cos(\Delta\phi)\sin(\Delta\theta)\omega\phi' + \sin(\Delta\phi)\omega\theta' + \cos(\Delta\phi)\cos(\Delta\theta)\omega\psi' \end{bmatrix} \quad (4)$$

The correction information storage unit 21 stores correction information including: $\Delta accX$, $\Delta accY$, and $\Delta accZ$ which are used in the above Expression 1; $\Delta\omega\phi$, $\Delta\omega\theta$, and $\Delta\omega\psi$ which are used in the above Expression 3; and $\Delta\phi$ and $\Delta\theta$ which are used in the above Expressions 2 and 4.

The correction information generating unit 22 generates the correction information based on the output value of the posture angle sensor 7. The correction information generating unit 22 includes an offset correction information generating unit 30 and a mounting correction information generating unit 32.

In the first exemplary embodiment, assume that the offset value of the acceleration sensor 10 and the bias value of the gyro sensor 11 are known. Specifically, the offset value of the acceleration sensor 10 is measured in advance prior to the mounting of the posture angle sensor 7 on the ECU 4 and the inverted two-wheel vehicle body 2 in the first exemplary embodiment. In this case, in order to measure the offset value of the acceleration sensor 10, the output value of the acceleration sensor 10 may be obtained, for example, when the substrate 12 of the posture angle sensor 7 is placed on a level surface. Further, since the bias value of the gyro sensor 11 is the output value obtained when the gyro sensor 11 is in a stationary state, the output value of the gyro sensor 11 may be obtained in a state where the gyro sensor 11 is brought into a stationary state.

Thus, the offset correction information generating unit 30 does not operate in the first exemplary embodiment. The offset value of the acceleration sensor 10 and the bias value of the gyro sensor 11, which are measured in advance, are stored in the correction information storage unit 21.

The mounting correction information generating unit 32 calculates the mounting angle error of the acceleration sensor 10 with respect to the inverted two-wheel vehicle body 2 based on the output value of the acceleration sensor 10 obtained when the inverted two-wheel vehicle 1 is brought into a stationary state in a state where the reference yaw axis Z of the inverted two-wheel vehicle 1 is made coincident with the vertical direction (i.e., a reference posture, a horizontal posture). Specifically, the mounting correction information generating unit 32 calculates the mounting angle error $\Delta\phi$ about the roll axis and the mounting angle error $\Delta\theta$ about the pitch axis based on Expression 5 shown below, and stores the calculation results in the correction information storage unit 21.

$$\Delta\theta = \tan^{-1}\left(-\frac{accX'}{accZ'}\right)$$
$$\Delta\phi = \tan^{-1}\left(\frac{accY'}{accZ' \times \cos\Delta\theta - accX' \times \sin\Delta\theta}\right) \quad (5)$$

The posture angle calculation unit 23 performs sensor fusion of the corrected acceleration and angular velocity, which are output from the correction unit 20, by using a Kalman filter or the like, thereby calculating the current posture angle of the inverted two-wheel vehicle 1 and outputting the calculation result to the inversion control unit 24.

The inversion control unit 24 performs inversion control of the inverted two-wheel vehicle 1 by driving the motors 9 using the posture angle of the inverted two-wheel vehicle 1 that is input from the posture angle calculation unit 23, and also performs traveling control of the inverted two-wheel vehicle 1 by driving the motors 9 based on operation information input from the handle angle sensor 8.

Figure 8:
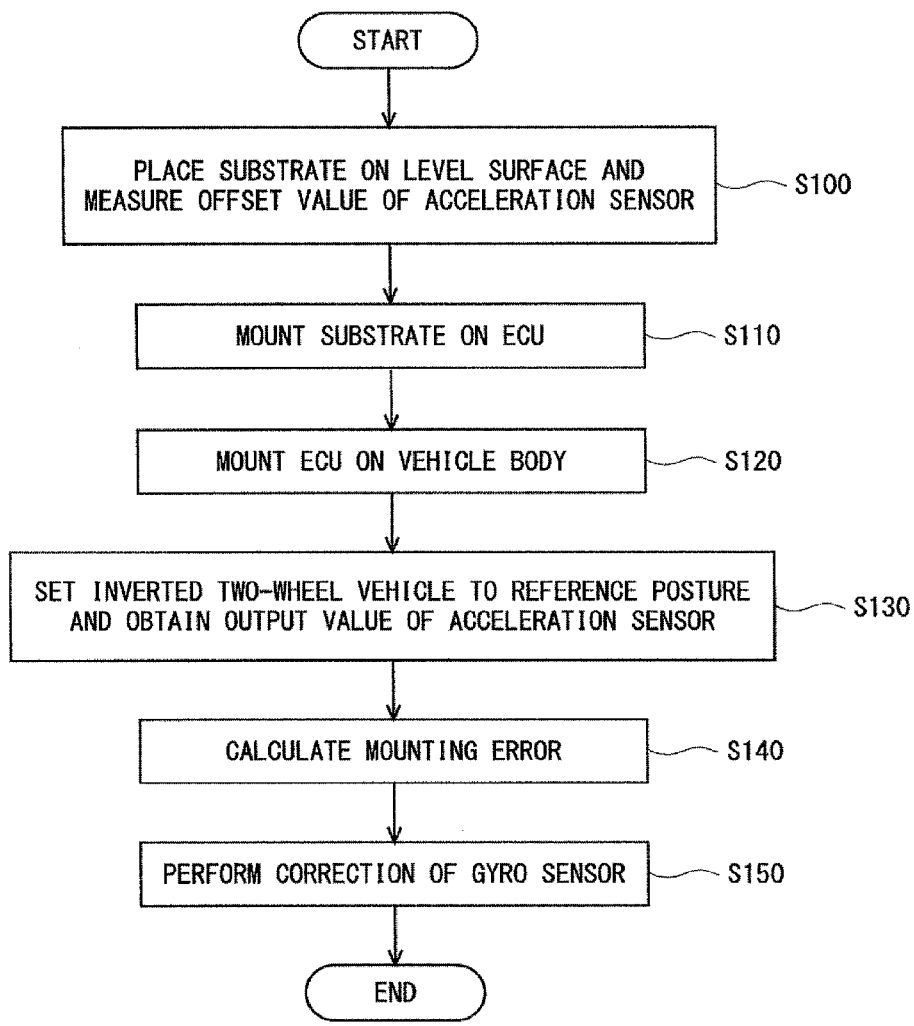
FIG. 8 is a flowchart showing an output value correction flow of the inverted two-wheel vehicle (first exemplary embodiment)

Referring next to FIG. 8, an output value correction flow of the inverted two-wheel vehicle 1 will be described.

In the output value correction flow shown in FIG. 8, prior to the mounting of the posture angle sensor 7 on the inverted two-wheel vehicle body 2, the substrate 12 of the posture angle sensor 7 is placed on a level surface, and the offset value of the acceleration sensor 10 is measured in advance (S100). The measurement result is stored in the correction information storage unit 21. The bias value of the gyro sensor 11 is measured at a desired timing, and the measurement result is stored in the correction information storage unit 21.

Next, the substrate 12 of the posture angle sensor 7 is mounted on the ECU 4 (S110)

Next, the ECU 4 is mounted on the inverted two-wheel vehicle body 2 (S 120).

Next, the mounting correction information generating unit 32 obtains the output value of the acceleration sensor 10 when the inverted two-wheel vehicle 1 is brought into a stationary state in the reference posture (S130).

Next, the mounting correction information generating unit 32 calculates a mounting angle error of the acceleration sensor 10 with respect to the inverted two-wheel vehicle body 2 by using the above Expressions 1 and 5 (S140).

Lastly, the correction unit 20 corrects the output value of the gyro sensor 11 by using the mounting angle error of the acceleration sensor 10 with respect to the inverted two-wheel vehicle body 2 as a mounting angle error of the gyro sensor 11 with respect to the inverted two-wheel vehicle body 2 (S150).

The first exemplary embodiment has the following features.

The inverted two-wheel vehicle 1 (inverted vehicle) includes: the inverted two-wheel vehicle body 2 (inverted vehicle body); the acceleration sensor 10 and the gyro sensor 11 which are mounted on the same substrate 12; and the ECU 4 (control device). The ECU 4 calculates a mounting angle error of the acceleration sensor 10 with respect to the inverted two-wheel vehicle body 2 based on an output value of the acceleration sensor 10 obtained when the inverted two-wheel vehicle 1 is brought into a stationary state in a state where the reference yaw axis of the inverted two-wheel vehicle 1 is made coincident with the vertical direction (S140), and corrects an output value of the gyro sensor 11 by using the mounting angle error of the acceleration sensor 10 with respect to the inverted two-wheel vehicle body 2 as a mounting angle error of the gyro sensor 11 with respect to the inverted two-wheel vehicle body 2 (S150). According to the above configuration, the output value of the gyro sensor 11 can be corrected without using a large test apparatus that allows the inverted two-wheel vehicle 1 itself to turn on a pivot.

Calibration of the gyro sensor 11 in the inverted two-wheel vehicle 1 including the inverted two-wheel vehicle body 2, and the acceleration sensor 10 and the gyro sensor 11 which are mounted on the same substrate 12 is performed in the following manner. (1) A mounting angle error of the acceleration sensor 10 with respect to the inverted two-wheel vehicle body 2 is calculated based on an output value of the acceleration sensor 10 obtained when the inverted two-wheel vehicle 1 is brought into a stationary state in a state where the reference yaw axis of the inverted two-wheel vehicle 1 is made coincident with the vertical direction (S140). (2) An output value of the gyro sensor 11 is corrected using the mounting angle error of the acceleration sensor 10 with respect to the inverted two-wheel vehicle body 2 as a mounting angle error of the gyro sensor 11 with respect to the inverted two-wheel vehicle body 2 (S150). According to the above method, the output value of the gyro sensor 11 can be corrected without using a large test apparatus that allows the inverted two-wheel vehicle 1 itself to turn on a pivot.

Further, the calibration is performed in the following manner. An offset value of the acceleration sensor 10 is obtained in advance prior to the mounting of the acceleration sensor 10 and the gyro sensor 11, which are mounted on the same substrate 12, on the inverted two-wheel vehicle body 2 (S100) According to the above method, the output value of the gyro sensor 11 can be corrected merely by bringing the inverted two-wheel vehicle 1 into the stationary state in the state where the reference yaw axis of the inverted two-wheel vehicle 1 is made coincident with the vertical direction, without the need for causing the inverted two-wheel vehicle 1 to make a special motion, such as inclination, after the vehicle is brought into the stationary state.

Second Exemplary Embodiment

Next, a second exemplary embodiment will be described with reference to FIGS. 9 and 10. Mainly points regarding the second exemplary embodiment which differ from the first exemplary embodiment will be described below, while descriptions of points regarding the second exemplary embodiment which are similar to those of the first exemplary embodiment will be omitted.

Figure 9:
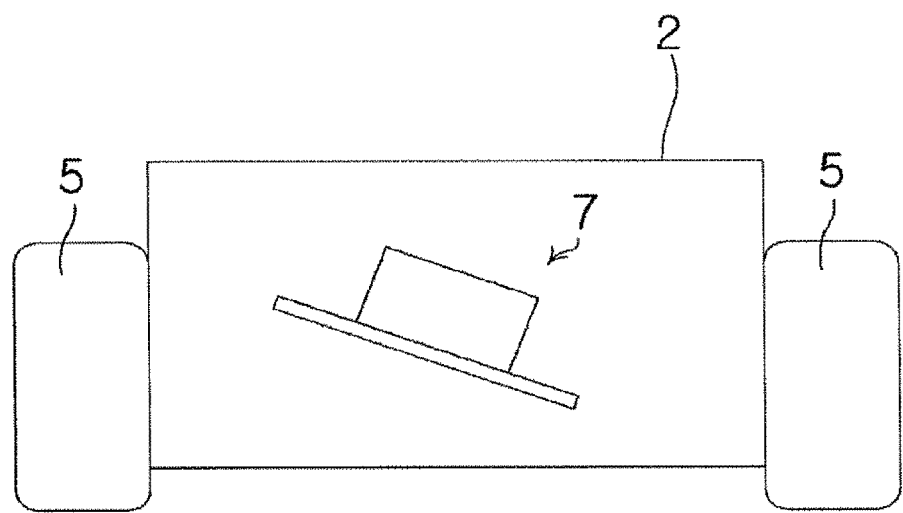
FIG. 9 is a schematic front view showing an inverted two-wheel vehicle body on which a posture angle sensor is mounted (second exemplary embodiment)

As shown in FIG. 9, in the second exemplary embodiment, the posture angle sensor 7 is not accommodated in the ECU 4, but is instead directly mounted on the inverted two-wheel vehicle body 2.

As shown in FIG. 8, in the first exemplary embodiment described above, the substrate 12 of the posture angle sensor 7 is mounted on the ECU 4 in S110, and the ECU 4 is mounted on the inverted two-wheel vehicle body 2 in S120.

Figure 10:
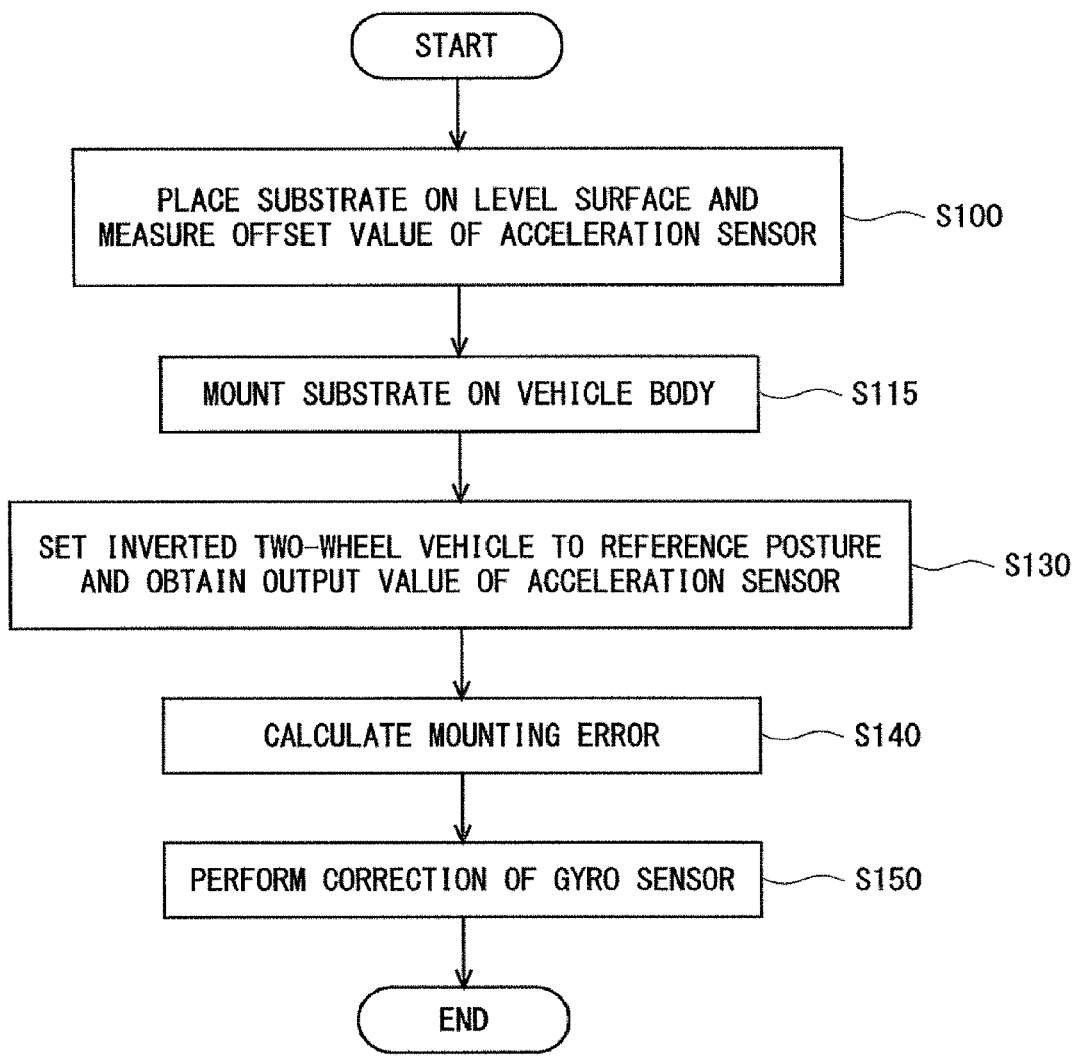
FIG. 10 is a flowchart showing an output value correction flow of an inverted two-wheel vehicle (second exemplary embodiment)

On the other hand, in the second exemplary embodiment, as shown in FIG. 10, the substrate 12 of the posture angle sensor 7 is directly mounted on the inverted two-wheel vehicle body 2 (S115), instead of carrying out the above-described steps S110 and S120.

In this manner, the posture angle sensor 7 may be mounted on the inverted two-wheel vehicle body 2 after the posture angle sensor 7 is accommodated in the ECU 4, or the posture angle sensor 7 may be directly mounted on the inverted two-wheel vehicle body 2. In any case, the advantageous effect that "the output value of the gyro sensor 11 can be corrected without using a large test apparatus that allows the inverted two-wheel vehicle 1 itself to turn on a pivot" and the advantageous effect that "the output value of the gyro sensor 11 can be corrected merely by bringing the inverted two-wheel vehicle 1 into a stationary state in a state where the reference yaw axis of the inverted two-wheel vehicle 1 is made coincident with the vertical direction, without causing the inverted two-wheel vehicle 1 to make a special motion, such as inclination, after the inverted two-wheel vehicle 1 is brought into the stationary state" can be obtained without any problem.

Third Exemplary Embodiment

Next, a third exemplary embodiment will be described with reference to FIG. 11. Mainly points regarding the third exemplary embodiment which differ from the first exemplary embodiment will be described below, while descriptions of points regarding the third exemplary embodiment which are similar to those of the first exemplary embodiment will be omitted.

In the first exemplary embodiment described above, the offset value of the acceleration sensor 10 is measured in advance prior to the mounting of the posture angle sensor 7 on the ECU 4 and the inverted two-wheel vehicle body 2.

On the other hand, in the third exemplary embodiment, the offset value of the acceleration sensor 10 is not measured in advance prior to the mounting of the posture angle sensor 7 on the ECU 4 and the inverted two-wheel vehicle body 2.

In other words, in the third exemplary embodiment, the posture angle sensor 7 is mounted on the inverted two-wheel vehicle body 2 and a mounting angle error of the acceleration sensor 10 with respect to the inverted two-wheel vehicle body 2 is obtained without the need for obtaining the offset value of the acceleration sensor 10 in advance. Further, the offset value of the acceleration sensor 10 is obtained using the mounting angle error of the acceleration sensor 10 with respect to the inverted two-wheel vehicle body 2.

Specifically, the mounting correction information generating unit 32 calculates a mounting angle error of the acceleration sensor 10 with respect to the inverted two-wheel vehicle body 2 based on: (a) an output value of the acceleration sensor 10 obtained when the inverted two-wheel vehicle 1 is set in a reference posture and is brought into a stationary state; (b) an output value of the acceleration sensor 10 obtained when the inverted two-wheel vehicle 1 in the reference posture is inclined at an arbitrary angle in the roll direction and is brought into a stationary state; and (c) an output value of the acceleration sensor 10 obtained when the inverted two-wheel vehicle 1 in the reference posture is inclined at an arbitrary angle in the pitch direction and is brought into a stationary state. That is, the mounting correction information generating unit 32 calculates the mounting angle error $\Delta\phi$ about the roll axis of the acceleration sensor 10 with respect to the inverted two-wheel vehicle body 2 and the mounting angle error $\Delta\theta$ about the pitch axis of the acceleration sensor 10 with respect to the inverted two-wheel vehicle body 2 based on Expression 6 shown below, and stores the calculation results in the correction information storage unit 21. In this case, Expression 6 shown below corresponds to the mounting angle error of the acceleration sensor 10 with respect to the inverted two-wheel vehicle body 2. In Expression 6, G represents gravitational acceleration. In the case of obtaining the mounting angle error $\Delta\phi$ about the roll axis of the acceleration sensor 10 with respect to the inverted two-wheel vehicle body 2, diff=(Y-axis acceleration in the reference posture)−(Y-axis acceleration during an inclination at an arbitrary angle in the roll direction) holds. In the case of obtaining the mounting angle error $\Delta\theta$ about the pitch axis of the acceleration sensor 10 with respect to the inverted two-wheel vehicle body 2, diff=(X-axis acceleration in the reference posture)−(X-axis acceleration during an inclination at an arbitrary angle in the pitch direction) holds. In Expression 6, $\alpha$ represents an arbitrary inclination angle.

$$\neq \cos^{-1}\left(\frac{\begin{pmatrix} 4 \cdot G \cdot \mathit{diff} \cdot \sin(\alpha) \neq \\ \sqrt{\begin{matrix} (16 \cdot G^2 \cdot \mathit{diff}^2 \cdot \sin^2(\alpha) - 4(2 \cdot G^2 - 4 \cdot G \cdot G \cdot \\ \cos(\alpha) + 2 \cdot G^2)(-2 \cdot G^2 + 4 \cdot G \cdot G \cdot \cos(\alpha) - \\ G^2 \cdot \cos(2\alpha) - G^2 + 2\mathit{diff}^2)) \end{matrix}} \end{pmatrix}}{(4(G^2 - 2 \cdot G \cdot G \cdot \cos(\alpha) + G^2))}\right) \quad (6)$$

The offset correction information generating unit 30 calculates the offset value of the acceleration sensor 10 by using the calculation result of the mounting correction information generating unit 32. Specifically, the offset correction information generating unit 30 calculates the offset value of the acceleration sensor 10 based on Expression 7 shown below, and stores the calculation result in the correction information storage unit 21. In Expression 7 shown below, accX, accY, and accZ respectively represent X-axis acceleration, Y-axis acceleration, and Z-axis acceleration of the acceleration sensor 10 when the inverted two-wheel vehicle 1 is set in the reference posture; ΔaccX, ΔaccY, and ΔaccZ respectively represent offset values of the X-axis acceleration, the Y-axis acceleration, and the Z-axis acceleration of the acceleration sensor 10; Δϕ represents a mounting angle error about the roll axis of the acceleration sensor 10 with respect to the inverted two-wheel vehicle body 2; Δθ represents a mounting angle error about the pitch axis of the acceleration sensor 10 with respect to the inverted two-wheel vehicle body 2; and G represents gravitational acceleration.

$$\begin{bmatrix} \Delta accX \\ \Delta accY \\ \Delta accZ \end{bmatrix} = \begin{bmatrix} accX \cdot \cos(\Delta\theta) + accZ \cdot \sin(\Delta\theta) \\ accX \cdot \sin(\Delta\phi)\sin(\Delta\theta) + accY \cdot \cos(\Delta\phi) - accZ \cdot \sin(\Delta\phi)\cos(\Delta\theta) \\ -accX \cdot \cos(\Delta\phi)\sin(\Delta\theta) + accY \cdot \sin(\Delta\phi) + accZ \cdot \cos(\Delta\phi)\cos(\Delta\theta) - G \end{bmatrix}. \quad (7)$$

Figure 11:
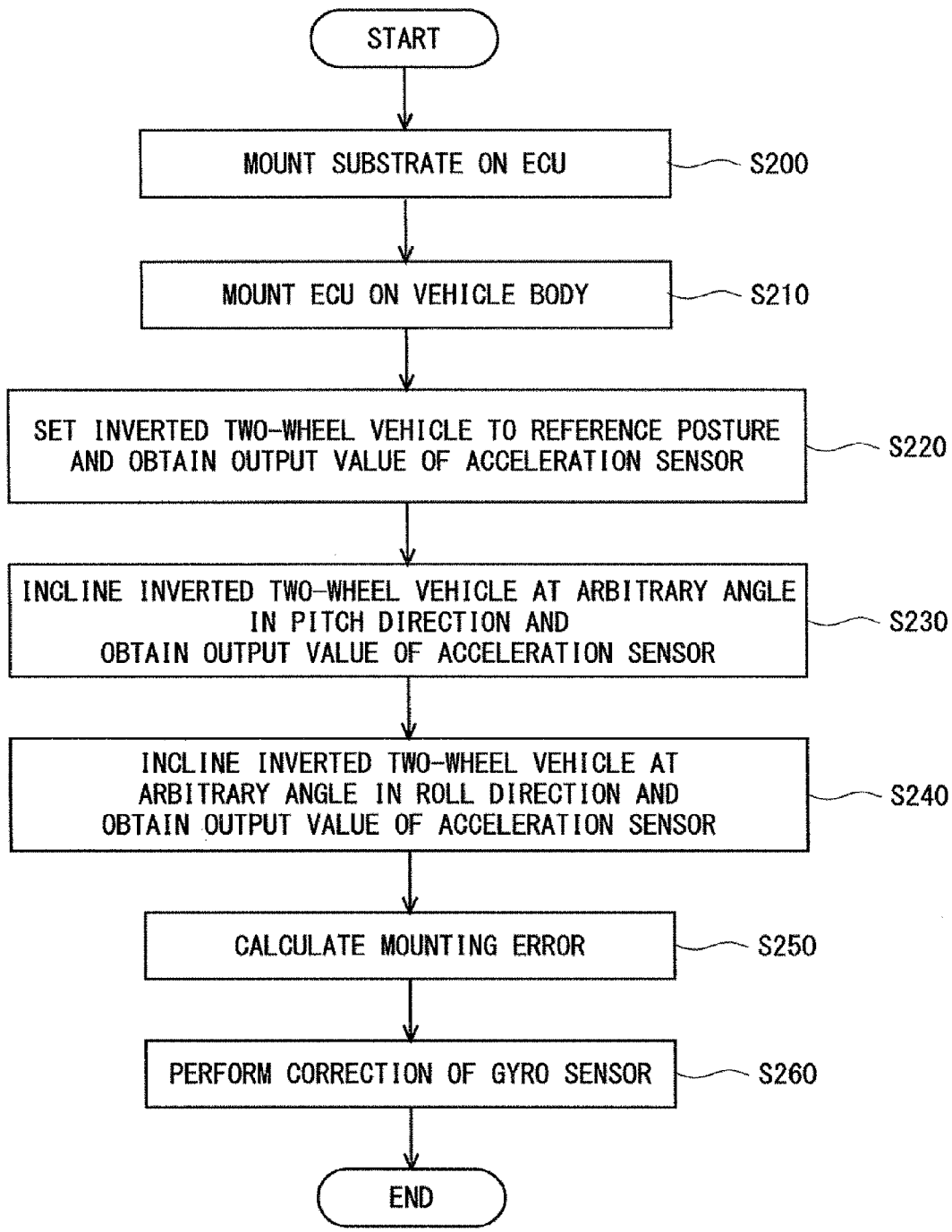
FIG. 11 is a flowchart showing an output value correction flow of an inverted two-wheel vehicle (third exemplary embodiment)

Referring next to FIG. 11, an output value correction flow of the inverted two-wheel vehicle 1 will be described.

First, the substrate 12 of the posture angle sensor 7 is mounted on the ECU 4 (S200).

Next, the ECU 4 is mounted on the inverted two-wheel vehicle body 2 (S210).

Next, the mounting correction information generating unit 32 obtains the output value of the acceleration sensor 10 when the inverted two-wheel vehicle 1 is brought into a stationary state in the reference posture (S220).

Next, an operator causes the inverted two-wheel vehicle 1 in the reference posture to be inclined at an arbitrary angle in the pitch direction. The mounting correction information generating unit 32 obtains the output value of the acceleration sensor 10 when the inverted two-wheel vehicle 1 in the reference posture is inclined at an arbitrary angle in the pitch direction and is brought into a stationary state (S230).

Next, the operator causes the inverted two-wheel vehicle 1 in the reference posture to be inclined at an arbitrary angle in the roll direction. The mounting correction information generating unit 32 obtains the output value of the acceleration sensor 10 when the inverted two-wheel vehicle 1 in the reference posture is inclined at an arbitrary angle in the roll direction and is brought into a stationary state (S240).

Next, the mounting correction information generating unit 32 calculates a mounting angle error of the acceleration sensor 10 with respect to the inverted two-wheel vehicle body 2 by using the above Expression 6 (S250).

Lastly, the correction unit 20 corrects the output value of the gyro sensor 11 by using the mounting angle error of the acceleration sensor 10 with respect to the inverted two-wheel vehicle body 2 as a mounting angle error of the gyro sensor 11 with respect to the inverted two-wheel vehicle body 2 (S260).

The third exemplary embodiment has the following features.

The ECU 4 calculates the mounting angle error of the acceleration sensor 10 with respect to the inverted two-wheel vehicle body 2 based on: (a) an output value of the acceleration sensor 10 obtained when the inverted two-wheel vehicle 1 is brought into a stationary state in a state where the reference yaw axis of the inverted two-wheel vehicle 1 is made coincident with the vertical direction; (b) an output value of the acceleration sensor 10 obtained when the inverted two-wheel vehicle 1 is inclined at an arbitrary angle in the roll direction from the state where the reference yaw axis of the inverted two-wheel vehicle 1 is made coincident with the vertical direction and the vehicle is then brought into a stationary state; and (c) an output value of the acceleration sensor 10 obtained when the inverted two-wheel vehicle 1 is inclined at an arbitrary angle in the pitch direction from the state where the reference yaw axis of the inverted two-wheel vehicle 1 is made coincident with the vertical direction and the vehicle is then brought into a stationary state (S250). According to the above configuration, the output value of the gyro sensor 11 can be corrected without the need for obtaining the offset value of the acceleration sensor 10 in advance prior to the mounting of the acceleration sensor 10 and the gyro sensor 11, which are mounted on the same substrate 12, on the inverted two-wheel vehicle body 2.

Calibration of the gyro sensor 11 is performed in the following manner. That is, a mounting angle error of the acceleration sensor 10 with respect to the inverted two-wheel vehicle body 2 is calculated based on: (a) an output value of the acceleration sensor 10 obtained when the inverted two-wheel vehicle 1 is brought into a stationary state in a state where the reference yaw axis of the inverted two-wheel vehicle 1 is made coincident with the vertical direction; (b) an output value of the acceleration sensor 10 obtained when the inverted two-wheel vehicle 1 is inclined at an arbitrary angle in the roll direction from the state where the reference yaw axis of the inverted two-wheel vehicle 1 is made coincident with the vertical direction and the vehicle is then brought into a stationary state; and (c) an output value of the acceleration sensor 10 obtained when the inverted two-wheel vehicle 1 is inclined at an arbitrary angle in the pitch direction from the state where the reference yaw axis of the inverted two-wheel vehicle 1 is made coincident with the vertical direction and the vehicle is then brought into a stationary state (S250). According to the above method, the output value of the gyro sensor 11 can be corrected without the need for obtaining the offset value of the acceleration sensor 10 in advance prior to the mounting of the acceleration sensor 10 and the gyro sensor 11 on the inverted two-wheel vehicle body 2.

Fourth Exemplary Embodiment

Next, a fourth exemplary embodiment will be described with reference to FIG. 12. Mainly points regarding the fourth exemplary embodiment which differ from the third exemplary embodiment will be described below, while descriptions of points regarding the fourth exemplary embodiment which are similar to those of the third exemplary embodiment will be omitted.

In the fourth exemplary embodiment, the posture angle sensor 7 is not accommodated in the ECU 4, but is instead directly mounted on the inverted two-wheel vehicle body 2.

As shown in FIG. 11, in the third exemplary embodiment described above, the substrate 12 of the posture angle sensor 7 is mounted on the ECU 4 in 5200, and the ECU 4 is mounted on the inverted two-wheel vehicle body 2 in 5210.

Figure 12:
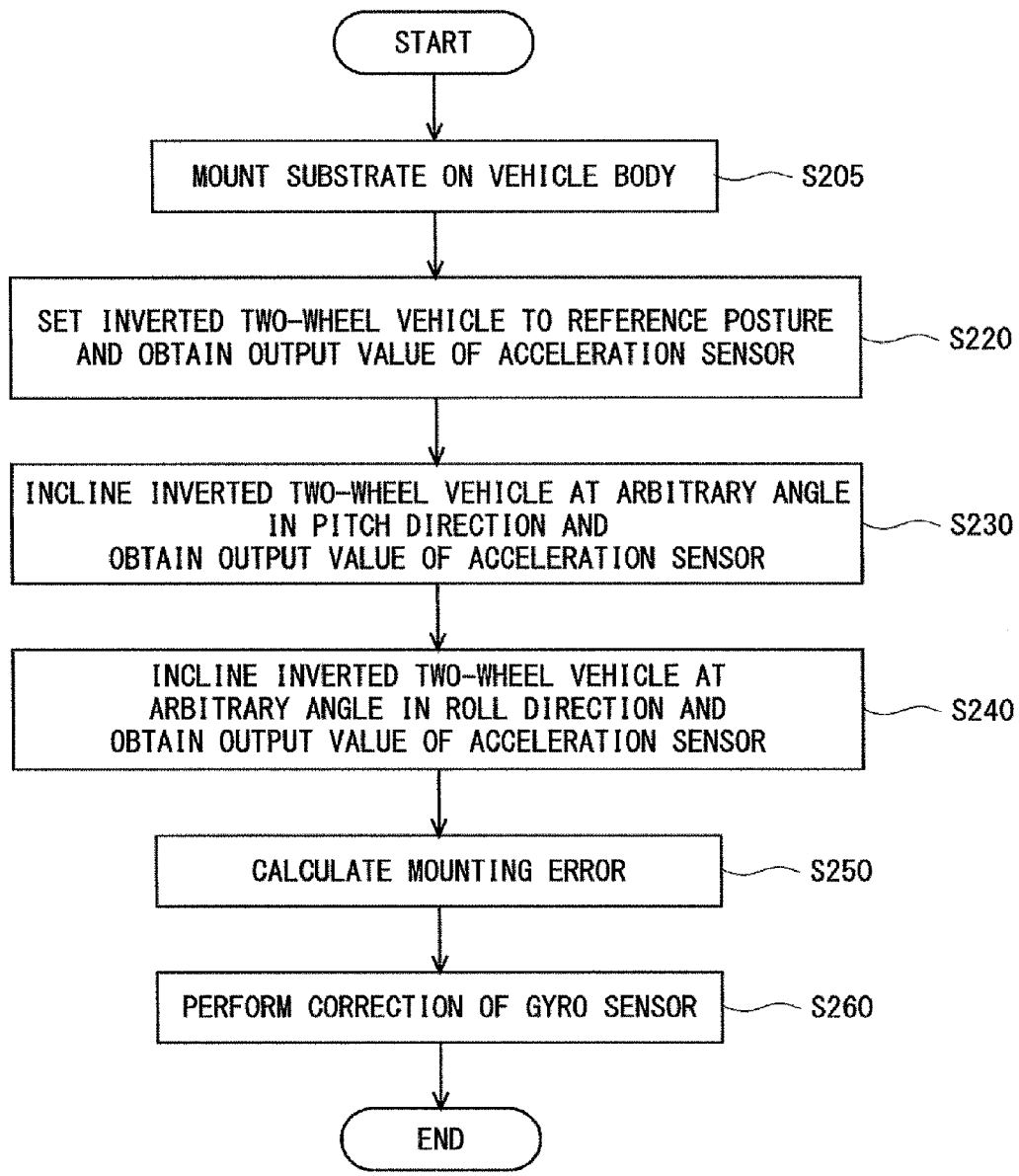
FIG. 12 is a flowchart showing an output value correction flow of an inverted two-wheel vehicle (fourth exemplary embodiment)

On the other hand, in the fourth exemplary embodiment, as shown in FIG. 12, the substrate 12 of the posture angle sensor 7 is directly mounted on the inverted two-wheel vehicle body 2 (S205), instead of carrying out the above-described steps S200 and S210.

Thus, the posture angle sensor 7 may be mounted on the inverted two-wheel vehicle body 2 after the posture angle sensor 7 is accommodated in the ECU 4, or the posture angle sensor 7 may be directly mounted on the inverted two-wheel vehicle body 2. In any case, the advantageous effect that "the output value of the gyro sensor 11 can be corrected without using a large test apparatus that allows the inverted two-wheel vehicle 1 itself to turn on a pivot", and the advantageous effect that "the output value of the gyro sensor 11 can be corrected without the need for obtaining an offset value of the acceleration sensor 10 in advance prior to the mounting of the acceleration sensor 10 and the gyro sensor 11, which are mounted on the same substrate 12, on the inverted two-wheel vehicle body 2" can be obtained without any problem.

Fifth Exemplary Embodiment

Next, a fifth exemplary embodiment will be described with reference to FIG. 13. Mainly points regarding the fifth exemplary embodiment which differ from the first exemplary embodiment will be described below, while descriptions of points regarding the fifth exemplary embodiment which are similar to those of the first exemplary embodiment will be omitted.

In the first exemplary embodiment described above, the offset value of the acceleration sensor 10 is measured in advance prior to the mounting of the posture angle sensor 7 on the ECU 4 and the inverted two-wheel vehicle body 2. During the measurement, the substrate 12 of the posture angle sensor 7 is placed on a level surface. However, it may be difficult to prepare a level surface in some cases. The fifth exemplary embodiment assumes a case where it is difficult to prepare a level surface, and therefore, the offset value of the acceleration sensor 10 is measured in advance prior to the mounting of the posture angle sensor 7 on the ECU 4 and the inverted two-wheel vehicle body 2 in the following manner.

Figure 13:
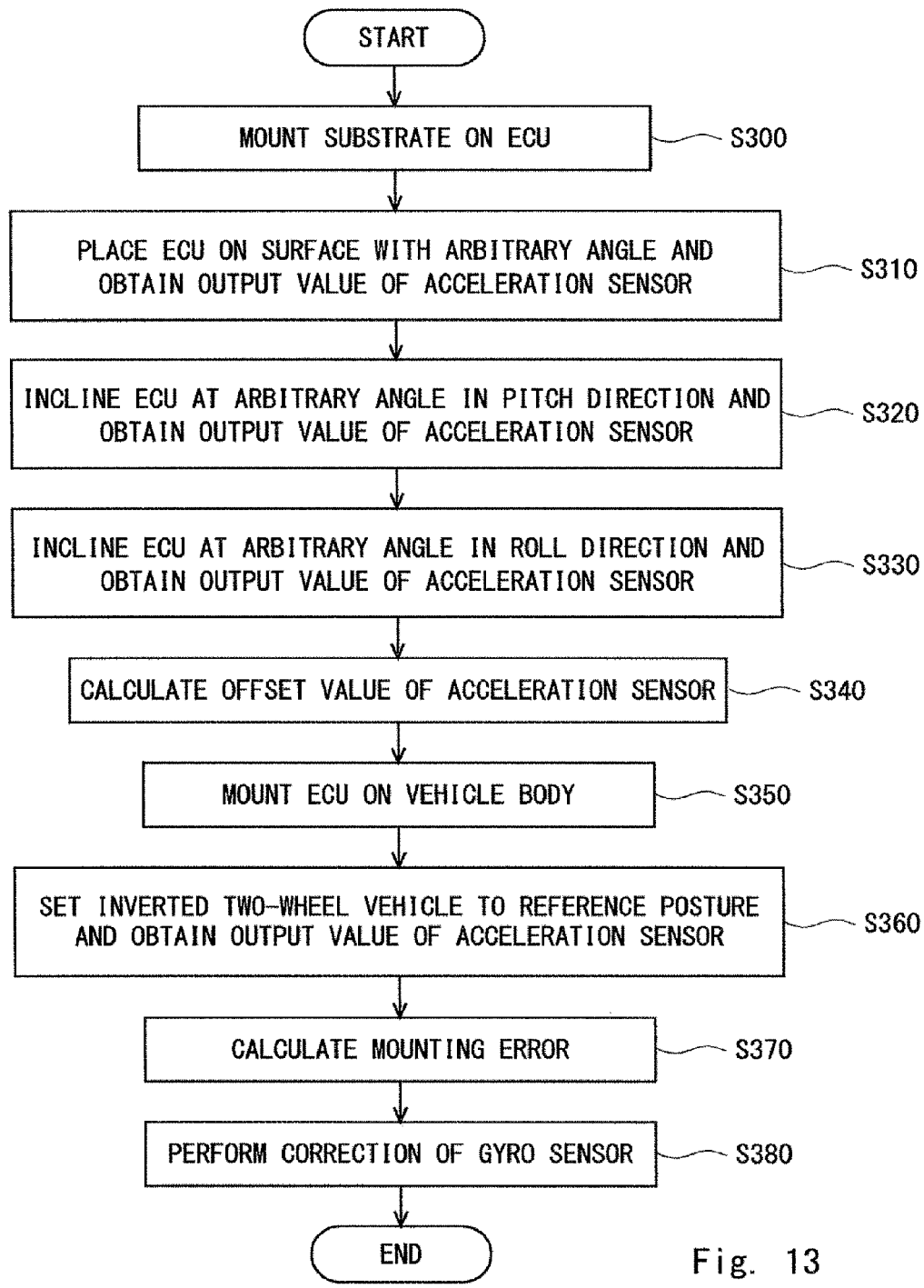
FIG. 13 is a flowchart showing an output value correction flow of an inverted two-wheel vehicle (fifth exemplary embodiment)

As shown in FIG. 13, the substrate 12 of the posture angle sensor 7 is first mounted on the ECU 4 (S300).

Next, the ECU 4 is placed on an arbitrary surface, which may be inclined, and the output value of the acceleration sensor 10 is obtained (S310).

Next, the ECU 4 in the state of S310 is inclined at an arbitrary angle in the pitch direction. The output value of the acceleration sensor 10 is obtained when the ECU 4 in the state of S310 is inclined at an arbitrary angle in the pitch direction and is brought into a stationary state (S320).

Next, the ECU 4 in the state of S310 is inclined at an arbitrary angle in the roll direction. The output value of the acceleration sensor 10 is obtained when the ECU 4 in the state of S310 is inclined at an arbitrary angle in the roll direction and is brought into a stationary state (S330).

Next, the offset value of the acceleration sensor 10 is calculated using Expressions 8 and 9 shown below (S340). In this case, Expression 8 shown below corresponds to an initial inclination angle of the ECU 4 in the state of S310. G represents gravitational acceleration. In the case of obtaining an initial inclination angle about the roll axis of the acceleration sensor 10, diff=(Y-axis acceleration in S310)−(Y-axis acceleration during an inclination at an arbitrary angle in the roll direction) holds. In the case of obtaining an initial inclination angle about the pitch axis of the acceleration sensor 10, diff=(X-axis acceleration in S310)−(X-axis acceleration during an inclination at an arbitrary angle in the pitch direction) holds. α represents an arbitrary inclination angle. In Expression 9 shown below, accX, accY, and accZ respectively represent X-axis acceleration, Y-axis acceleration, and Z-axis acceleration of the acceleration sensor 10 in the state of S310; ΔaccX, ΔaccY, and ΔaccZ respectively represent offset values of the X-axis acceleration, the Y-axis acceleration, and the Z-axis acceleration of the acceleration sensor 10; Δϕ represents an initial inclination angle about the roll axis of the ECU 4 in the state of S310; Δθ represents an initial inclination angle about the pitch axis of the ECU 4 in the state of S310; and G represents gravitational acceleration.

$$4 \cdot G \cdot diff \cdot \sin(\alpha) \neq \sqrt{\begin{aligned}(16 \cdot G^2 \cdot diff^2 \cdot \sin^2(\alpha) - 4(2 \cdot G^2 - 4 \cdot G \cdot G \cdot \\ \cos(\alpha) + 2 \cdot G^2)(-2 \cdot G^2 + 4 \cdot G \cdot G \cdot \cos(\alpha) - \\ G^2 \cdot \cos(2\alpha) - G^2 + 2diff^2))\end{aligned}}$$

$$\neq \cos^{-1}\left(\frac{\ldots}{(4(G^2 - 2 \cdot G \cdot G \cdot \cos(\alpha) + G^2))}\right) \quad (8)$$

$$\begin{bmatrix} \Delta accX \\ \Delta accY \\ \Delta accZ \end{bmatrix} = \begin{bmatrix} accX \cdot \cos(\Delta\theta) + accZ \cdot \sin(\Delta\theta) \\ accX \cdot \sin(\Delta\phi)\sin(\Delta\theta) + accY \cdot \cos(\Delta\phi) - accZ \cdot \sin(\Delta\phi)\cos(\Delta\theta) \\ -accX \cdot \cos(\Delta\phi)\sin(\Delta\theta) + accY \cdot \sin(\Delta\phi) + accZ \cdot \cos(\Delta\phi)\cos(\Delta\theta) - G \end{bmatrix}. \quad (9)$$

Next, the ECU 4 is mounted on the inverted two-wheel vehicle body 2 (S350). Next, the mounting correction information generating unit 32 obtains the output value of the acceleration sensor 10 when the inverted two-wheel vehicle 1 is brought into a stationary state in the reference posture (S360).

Next, the mounting correction information generating unit 32 calculates a mounting angle error of the acceleration sensor 10 with respect to the inverted two-wheel vehicle body 2 by using the above Expressions 1 and 5 (S370).

Lastly, the correction unit 20 corrects the output value of the gyro sensor 11 by using the mounting angle error of the acceleration sensor 10 with respect to the inverted two-wheel vehicle body 2 as a mounting angle error of the gyro sensor 11 with respect to the inverted two-wheel vehicle body 2 (S380).

According to the above method, the advantageous effect that "the output value of the gyro sensor 11 can be corrected without using a large test apparatus that allows the inverted two-wheel vehicle 1 itself to turn on a pivot" and the advantageous effect that "the output value of the gyro sensor 11 can be corrected merely by bringing the inverted two-wheel vehicle 1 into a stationary state in a state where the reference yaw axis of the inverted two-wheel vehicle 1 is made coincident with the vertical direction, without causing the inverted two-wheel vehicle 1 to make a special motion, such as inclination, after the inverted two-wheel vehicle 1 is brought into the stationary state" can be obtained without any problem.

Sixth Exemplary Embodiment

Next, a sixth exemplary embodiment will be described with reference to FIG. 14. Mainly points regarding the sixth exemplary embodiment which differ from the fifth exemplary embodiment will be described below, while descriptions of points regarding the sixth exemplary embodiment which are similar to those of the fifth exemplary embodiment will be omitted.

In the sixth exemplary embodiment, the posture angle sensor 7 is not accommodated in the ECU 4, but is instead directly mounted on the inverted two-wheel vehicle body 2. The method for obtaining the offset value of the acceleration sensor 10 is substantially the same as that of the fifth exemplary embodiment described above.

Figure 14:
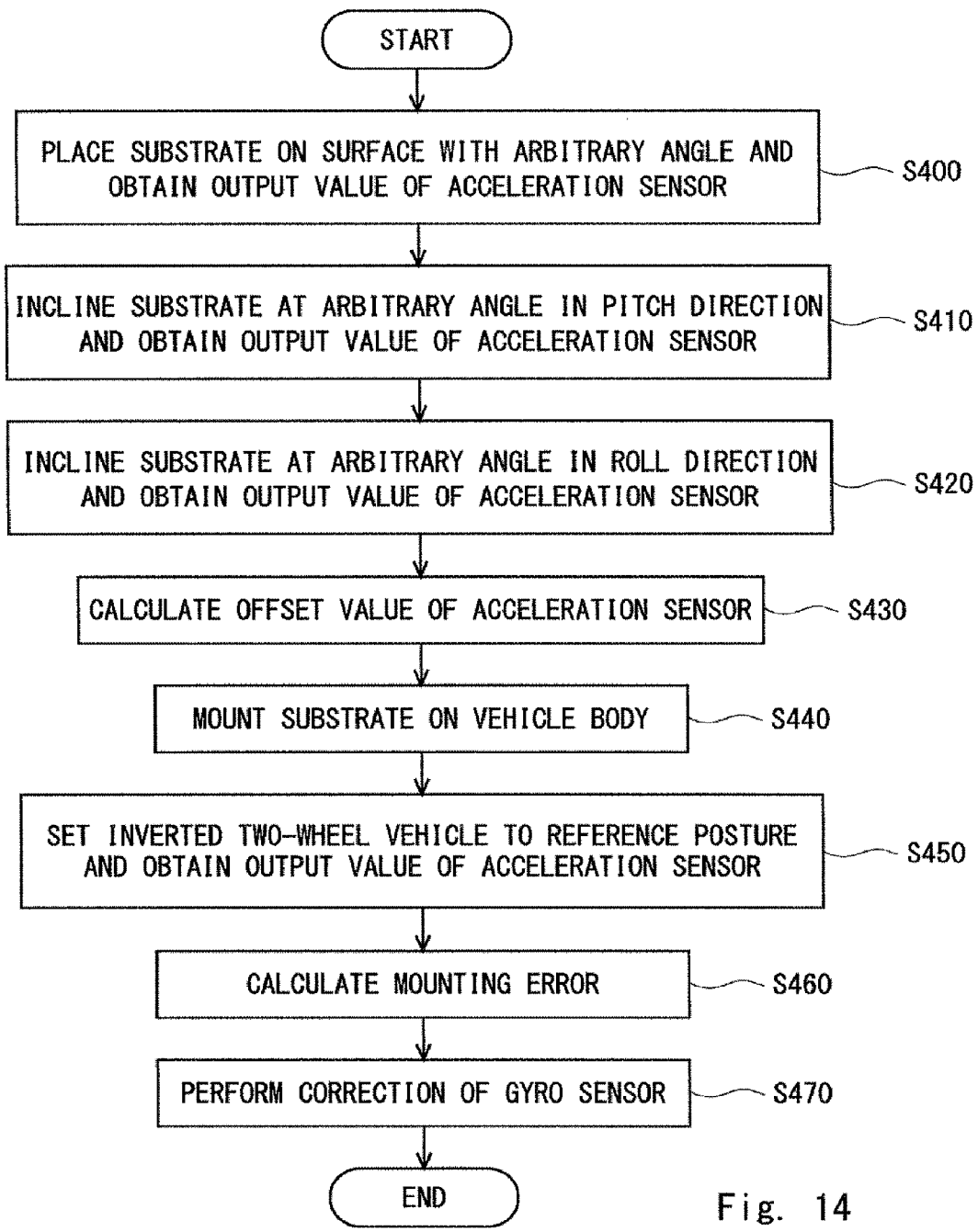
FIG. 14 is a flowchart showing an output value correction flow of an inverted two-wheel vehicle (sixth exemplary embodiment).

As shown in FIG. 14, the substrate 12 of the posture angle sensor 7 is first placed on an arbitrary surface, which may be inclined, and the output value of the acceleration sensor 10 is obtained (S400).

Next, the substrate 12 of the posture angle sensor 7 in the state of S400 is inclined to the pitch direction at an arbitrary angle. The output value of the acceleration sensor 10 is obtained when the substrate 12 of the posture angle sensor 7 in the state of S400 is inclined in the pitch direction at an arbitrary angle and brought into a stationary state (S410).

Next, the substrate 12 of the posture angle sensor 7 in the state of S400 is inclined at an arbitrary angle in the roll direction. The output value of the acceleration sensor 10 is obtained when the substrate 12 of the posture angle sensor 7 in the state of S400 is inclined at an arbitrary angle in the roll direction and is brought into a stationary state (S420).

Next, the offset value of the acceleration sensor 10 is calculated using Expressions 10 and 11 shown below (S430). In this case, Expression 10 shown below corresponds to an initial inclination angle of the substrate 12 of the posture angle sensor 7 in the state of S400. G represents gravitational acceleration. In the case of obtaining an initial inclination angle about the roll axis of the acceleration sensor 10, diff=(Y-axis acceleration in S400)–(Y-axis acceleration during an inclination at an arbitrary angle in the roll direction) holds. In the case of obtaining an initial inclination angle about the pitch axis of the acceleration sensor 10, diff=(X-axis acceleration in S400)–(X-axis acceleration during an inclination at an arbitrary angle in the pitch direction) holds a represents an arbitrary inclination angle. In Expression 11 shown below, accX, accY, and accZ respectively represent X-axis acceleration, Y-axis acceleration, and Z-axis acceleration of the acceleration sensor 10 in the state of S400; ΔaccX, ΔaccY, and ΔaccZ respectively represent offset values of the X-axis acceleration, the Y-axis acceleration, and the Z-axis acceleration of the acceleration sensor 10; Δϕ represents an initial inclination angle about the roll axis of the substrate 12 of the posture angle sensor 7 in the state of S400; Δθ represents an initial inclination angle about the pitch axis of the substrate 12 of the posture angle sensor 7 in the state of S400; and G represents gravitational acceleration.

$$\neq \cos^{-1}\left(\frac{4 \cdot G \cdot \mathit{diff} \cdot \sin(\alpha) \neq \sqrt{\begin{array}{l}(16 \cdot G^2 \cdot \mathit{diff}^2 \cdot \sin^2(\alpha) - \\ 4(2 \cdot G^2 - 4 \cdot G \cdot G \cdot \cos(\alpha) + 2 \cdot G^2) \\ (-2 \cdot G^2 + 4 \cdot G \cdot G \cdot \cos(\alpha) - \\ G^2 \cdot \cos(2\alpha) - G^2 + 2\mathit{diff}^2))\end{array}}}{(4(G^2 - 2 \cdot G \cdot G \cdot \cos(\alpha) + G^2))}\right) \quad (10)$$

$$\begin{bmatrix} \Delta accX \\ \Delta accY \\ \Delta accZ \end{bmatrix} = \begin{bmatrix} accX \cdot \cos(\Delta\theta) + accZ \cdot \sin(\Delta\theta) \\ accX \cdot \sin(\Delta\phi)\sin(\Delta\theta) + accY \cdot \cos(\Delta\phi) - accZ \cdot \sin(\Delta\phi)\cos(\Delta\theta) \\ -accX \cdot \cos(\Delta\phi)\sin(\Delta\theta) + accY \cdot \sin(\Delta\phi) + accZ \cdot \cos(\Delta\phi)\cos(\Delta\theta) - G \end{bmatrix}. \quad (11)$$

Next, the substrate 12 of the posture angle sensor 7 is mounted on the inverted two-wheel vehicle body 2 (S440).

Next, the mounting correction information generating unit 32 obtains the output value of the acceleration sensor 10 when the inverted two-wheel vehicle 1 is brought into a stationary state in the reference posture (S450).

Next, the mounting correction information generating unit 32 calculates a mounting angle error of the acceleration sensor 10 with respect to the inverted two-wheel vehicle body 2 by using the above Expressions 1 and 5 (S460).

Lastly, the correction unit 20 corrects the output value of the gyro sensor 11 by using the mounting angle error of the acceleration sensor 10 with respect to the inverted two-wheel vehicle body 2 as a mounting angle error of the gyro sensor 11 with respect to the inverted two-wheel vehicle body 2 (S470).

Thus, the posture angle sensor 7 may be mounted on the inverted two-wheel vehicle body 2 after the posture angle sensor 7 is accommodated in the ECU 4, or the posture angle sensor 7 may be directly mounted on the inverted two-wheel vehicle body 2. In any case, the advantageous effect that "the output value of the gyro sensor 11 can be corrected without using a large test apparatus that allows the inverted two-wheel vehicle 1 itself to turn on a pivot" and the advantageous effect that "the output value of the gyro sensor 11 can be corrected merely by bringing the inverted two-wheel vehicle 1 into a stationary state in a state where the reference yaw axis of the inverted two-wheel vehicle 1 is made coincident with the vertical direction, without causing the inverted two-wheel vehicle 1 to make a special motion, such as inclination, after the inverted two-wheel vehicle 1 is brought into the stationary state" can be obtained without any problem.

In the above exemplary embodiments, the inverted two-wheel vehicle 1 is illustrated as an exemplary vehicle.

However, a vehicle other than an inverted two-wheel vehicle, or a non-inverted vehicle can also be used. Specifically, the inverted two-wheel vehicle 1 according to the above exemplary embodiments includes the two wheels 5 and the two motors 9 which drive the two wheels 5, respectively. However, instead of this, the inverted two-wheel vehicle 1 including one or three or more wheels, and one or three or more motors which drive the one or three or more wheels 5, respectively, may be used.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A sensor calibration method for a vehicle, the vehicle comprising: a vehicle body; an acceleration sensor; and a gyro sensor, a geometrical posture of the gyro sensor with respect to the acceleration sensor being known, the sensor calibration method comprising:
    calculating a mounting angle error of the acceleration sensor with respect to the vehicle body based on an output value of the acceleration sensor when the vehicle is brought into a stationary state in a state where a reference yaw axis of the vehicle is made coincident with a vertical direction; and
    correcting an output value of the gyro sensor by using the mounting angle error of the acceleration sensor with respect to the vehicle body as a mounting angle error of the gyro sensor with respect to the vehicle body.

2. The sensor calibration method according to claim 1, wherein an offset value of the acceleration sensor is obtained in advance prior to mounting of the acceleration sensor and the gyro sensor on the vehicle body.

3. The sensor calibration method according to claim 1, wherein the mounting angle error of the acceleration sensor with respect to the vehicle body is calculated based on: an output value of the acceleration sensor obtained when the vehicle is brought into the stationary state in the state where the reference yaw axis of the vehicle is made coincident with the vertical direction; an output value of the acceleration sensor obtained when the vehicle is inclined at an arbitrary angle in a roll direction from the state where the reference yaw axis of the vehicle is made coincident with the vertical direction and the vehicle is then brought into the stationary state; and an output value of the acceleration sensor obtained when the vehicle is inclined at an arbitrary angle in a pitch direction from the state where the reference yaw axis of the vehicle is made coincident with the vertical direction and the vehicle is then brought into the stationary state.

* * * * *